United States Patent
Raymond (10) Patent No.: US 12,499,396 B1
(45) Date of Patent: Dec. 16, 2025

(54) SYSTEM AND METHOD OF PREPACK CONFIGURATION PLANNING FOR DISTRIBUTING ITEMS

(71) Applicant: JDA Software Group, Inc., Scottsdale, AZ (US)

(72) Inventor: Vincent Raymond, Montreal (CA)

(73) Assignee: Blue Yonder Group, Inc., Scottsdale, AZ (US)

( * ) Notice: Subject to any disclaimer, the term of this patent is extended or adjusted under 35 U.S.C. 154(b) by 100 days.

(21) Appl. No.: 15/840,756

(22) Filed: Dec. 13, 2017

Related U.S. Application Data (60) Provisional application No. 62/433,341, filed on Dec. 13, 2016.

(51) Int. Cl.
| | |
|---|---|
| *G06Q 10/00* | (2023.01) |
| *G06Q 10/04* | (2023.01) |
| *G06Q 10/0631* | (2023.01) |
| G06Q 10/067 | (2023.01) |
| G06Q 50/40 | (2024.01) |

(52) U.S. Cl.
CPC ....... *G06Q 10/06315* (2013.01); *G06Q 10/04* (2013.01); *G06Q 10/067* (2013.01); *G06Q 50/40* (2024.01)

(58) Field of Classification Search
CPC ......... G06Q 10/0838; G06Q 10/06315; G06Q 10/04; G06Q 50/40; G06Q 10/06
USPC ................. 705/7.12, 7.11, 7.25, 28
See application file for complete search history.

(56) References Cited

U.S. PATENT DOCUMENTS

| | | | |
|---|---|---|---|
| 8,688,497 B2* | 4/2014 | McMains | G06Q 10/06315 705/7.11 |
| 8,812,338 B2* | 8/2014 | Pratt | G06Q 10/063 705/28 |
| 10,109,004 B1* | 10/2018 | Hawley | G06Q 10/06375 |
| 2003/0110228 A1* | 6/2003 | Xu | H04L 67/54 709/224 |
| 2009/0132307 A1* | 5/2009 | Messer | G06Q 10/10 705/1.1 |

(Continued)

OTHER PUBLICATIONS

Pu Wang, "Pack Optimization Problem: Models and Solution Methods" (Year: 2010).*

*Primary Examiner* — Brian M Epstein
*Assistant Examiner* — Reham K Abouzahra
(74) *Attorney, Agent, or Firm* — Spencer Fane LLP; Steven J. Laureanti (57) ABSTRACT

A system and method are disclosed including a prepack planner that determines an initial prepack configuration of a package including two or more items, which include one or more attributes and two or more attribute values. The prepack planner also evaluates the initial prepack configuration by solving a mixed integer problem model and selects the initial prepack configuration to be the parent prepack configuration. The prepack planner further generates one or more child prepack configurations by attributing the number of the two or more attribute values to the one or more child prepack configurations and mutates the one or more child prepack configurations by changing the two or more attribute values with two of the two or more attributes and compares the initial prepack configuration with a stop criteria to determine whether a stop criteria has been reached.

20 Claims, 3 Drawing Sheets

(56) References Cited

U.S. PATENT DOCUMENTS

| | | | | |
|---|---|---|---|---|
| 2009/0228361 A1* | 9/2009 | Wilson | G06Q 30/0256 | 705/14.42 |
| 2009/0271241 A1* | 10/2009 | Pratt | G06Q 10/063 | 705/7.11 |
| 2009/0319401 A1* | 12/2009 | Rao | G06Q 10/087 | 705/29 |
| 2012/0179507 A1* | 7/2012 | McMains | G06Q 10/087 | 705/7.25 |
| 2012/0284071 A1* | 11/2012 | Vakhutinsky | G06Q 10/08 | 705/7.12 |
| 2012/0284079 A1* | 11/2012 | Vakhutinsky | G06Q 10/04 | 705/7.25 |
| 2013/0166468 A1* | 6/2013 | Vogelgesang | G06Q 10/087 | 705/330 |
| 2013/0262336 A1* | 10/2013 | Wan | G06Q 10/087 | 705/339 |
| 2014/0136271 A1* | 5/2014 | Rangarajan | G06Q 10/06315 | 705/7.25 |
| 2015/0142516 A1* | 5/2015 | Schwans | G06Q 10/087 | 705/7.31 |
| 2015/0286986 A1* | 10/2015 | Waller | G06Q 30/0255 | 705/26.81 |
| 2016/0171408 A1* | 6/2016 | Gooijer | G06Q 10/06315 | 705/7.25 |
| 2017/0206480 A1* | 7/2017 | Naumann | G06Q 10/06 | |

\* cited by examiner

SYSTEM AND METHOD OF PREPACK CONFIGURATION PLANNING FOR DISTRIBUTING ITEMS

CROSS-REFERENCE TO RELATED APPLICATIONS

The present disclosure is related to that disclosed in the U.S. Provisional Application No. 62/433,341, filed Dec. 13, 2016, entitled "Prepack Genetic Heuristic." U.S. Provisional Application No. 62/433,341 is assigned to the assignee of the present application. The subject matter disclosed in U.S. Provisional Application No. 62/433,341 is hereby incorporated by reference into the present disclosure as if fully set forth herein. The present invention hereby claims priority under 35 U.S.C. § 119(e) to U.S. Provisional Application No. 62/433,341.

TECHNICAL FIELD

The present disclosure relates generally to prepack configuration planning and specifically to a system and method of prepack configuration planning for distributing items.

BACKGROUND

In a supply chain network, various supply chain entities must be resupplied with items from one or more distribution points, often prior to a stock out. For example, a distributor may resupply items to a retail store in response to a request from the retail store for more inventory or in response to a predicted demand. Determining how many packages to ship to each retail store, the amount and configuration of items in the packages, and the demand at the retail store is a nonlinear optimization prepack problem. These factors and constraints have proven challenging for traditional solutions to efficiently solve the prepack problems. The complexity to determine a prepack solution with so many factors and constraints is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described more fully below, aspects of the following disclosure relate to prepack configuration planning for distributing items, based on solving prepack problems using a genetic heuristic and a mixed integer problem (MIP) model. According to a first approach of prepack configuration planning, embodiments disclose a method that minimizes a penalty associated with an over-cover and an under-cover of the demand for each retail store and each item. This approach includes the forecasted demand by retail store by item and the maximum over-cover by store by item. According to a second approach of prepack configuration planning, embodiments disclose a method that penalizes overstock heavier than understock by appending a larger coefficient to the over slack variable, then the understock variable. This approach also requires that the amount of items shipped to a retail store must equal demand within a range determined by the slack variables. Among other things, this reduces the complexity of the prepack problem and minimizes the number of iterations required to solve the prepack problem, which enables embodiments to reduce the time required to solve the prepack problem.

Figure 1:
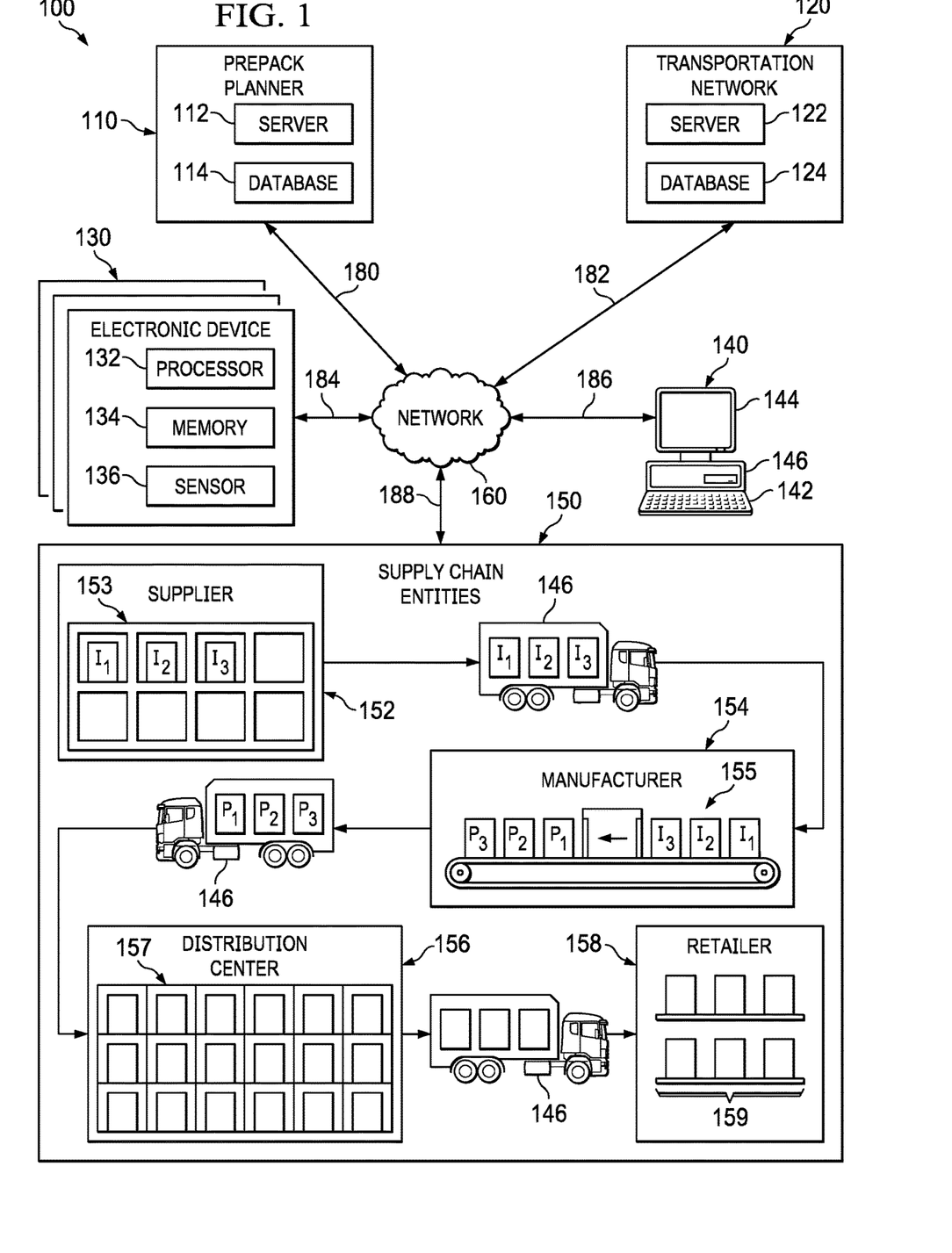
FIG. 1 illustrates an exemplary supply chain network, according to a first embodiment.

FIG. 1 illustrates exemplary supply chain network 100 according to a first embodiment. Supply chain network 100 comprises prepack planner 110, one or more electronic devices 130, transportation network 120, one or more supply chain entities 150, computer 140, network 160, and communication links 180-186. Although a single prepack planner 110, one or more electronic devices 130, a single transportation network 120, one or more supply chain entities 150, a single computer 140, a single network 160, and one or more communication links 180-186 are shown and described, embodiments contemplate any number of prepack planners, inventory systems, imagers, transportation systems, supply chain entities, computers, networks, or communication links, according to particular needs.

In one embodiment, prepack planner 110 comprises server 112 and database 114. As explained in more detail below, prepack planner 110 determines a prepack solution which includes how many packages to ship to the one or more retailers 150 via transportation network 120 and the amount and configuration of items in each package. One or more electronic devices 130 receives imaging information from one or more sensors 136 or from one or more databases in supply chain network 100. According to embodiments, one or more electronic devices 130 comprise one or more processors 132, memory 134, and one or more sensors 136 and may include any suitable input device, output device, fixed or removable computer-readable storage media, or the like. According to embodiments, one or more electronic devices 130 identify items near the one or more sensors 136 and generate a mapping of the item in supply chain network 100. As explained in more detail below, transportation network 120 uses the mapping of an item to locate the item in supply chain network 100. The location of the item is then used to coordinate the storage and transportation of items in supply chain network 100 to implement one or more prepack configurations generated by prepack planner 110.

One or more electronic devices 130 may comprise a mobile handheld device such as, for example, a smartphone, a tablet computer, a wireless device, or the like. In addition, or as an alternative, one or more electronic devices 130 comprise one or more networked electronic devices configured to transmit item identity information to one or more databases as an item passes by or is scanned by one or more electronic devices 130. This may include, for example, a stationary scanner located at one or more supply chain entities 150 that identifies items as the items pass near the scanner, such as, for example, a scanning system at one or more suppliers 152, one or more manufacturers 154 and/or one or more distribution centers 165 that records inventory data and associates the inventory data with item data, including, for example, associating location data, and the like with item data. One or more sensors 136 of one or more electronic devices 130 may comprise an imaging sensor, such as, a camera, scanner, electronic eye, photodiode, charged coupled device (CCD), or any other electronic or manual sensor that detects images of items. In addition, or as an alternative, one or more sensors 136 may comprise a radio receiver and/or transmitter configured to read an electronic tag, such as, for example, an RFID tag.

Transportation network 120 comprises server 122 and database 124. According to embodiments, transportation network 120 directs one or more transportation vehicles 146 to ship one or more packages between one or more supply chain entities 150, based, at least in part, on the prepack configuration generated by prepack planner 110. Transportation vehicles 146 comprise, for example, any number of trucks, cars, vans, boats, airplanes, unmanned aerial vehicles (UAVs), cranes, robotic machinery, or the like. Transportation vehicles 146 may comprise radio, satellite, or other communication that communicates location information (such as, for example, geographic coordinates, distance from a location, global positioning satellite (GPS) information, or the like) with prepack planner 110, one or more electronic devices 130, transportation network 120, and/or one or more supply chain entities 150 to identify the location of the transportation vehicle 146 and the location of any inventory or shipment located on the transportation vehicle 146. In addition to the prepack configuration, the number of items shipped by transportation vehicles 146 in transportation network 120 may also be based, at least in part, on the configuration of each package, the quantity of packages needed to satisfy demand, the number of items currently in stock at one or more supply chain entities 150, the number of items currently in transit in transportation network 120, the forecasted production levels at one or more manufacturers 154, forecasted demand, item attributes, pack constraints, store constraints, and the like.

As shown in FIG. 1, supply chain network 100 operates on one or more computers 140 that are integral to or separate from the hardware and/or software that support prepack planner 110, one or more electronic devices 130, transportation network 120, and one or more supply chain entities 150. Computers 140 may include any suitable input device 142, such as a keypad, mouse, touch screen, microphone, or other device to input information. Output device 144 may convey information associated with the operation of supply chain network, including digital or analog data, visual information, or audio information. Computer 140 may include fixed or removable computer-readable storage media, including a non-transitory computer readable medium, magnetic computer disks, flash drives, CD-ROM, in-memory device or other suitable media to receive output from and provide input to supply chain network 100. Computer 140 may include one or more processors 146 and associated memory to execute instructions and manipulate information according to the operation of supply chain network 100 and any of the methods described herein. In addition, or as an alternative, embodiments contemplate executing the instructions on computer 140 that cause computer 140 to perform functions of the method. Further examples may also include articles of manufacture including tangible computer-readable media that have computer-readable instructions encoded thereon, and the instructions may comprise instructions to perform functions of the methods described herein. According to some embodiments, the functions and methods described in connection with one or more electronic devices 130 may be emulated by one or more modules configured to perform the functions and methods as described.

In addition, and as discussed herein, supply chain network 100 may comprise a cloud-based computing system having processing and storage devices at one or more locations, local to, or remote from prepack planner 110, one or more electronic devices 130, transportation network 120, and one or more supply chain entities 150. In addition, each of one or more computers 140 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with prepack planner 110, one or more electronic devices 130, transportation network 120, and one or more supply chain entities 150. These one or more users may include, for example, a "manager" or a "planner" handling demand planning for determining how many packages to ship to each of the one or more supply chain entities 150, including the configuration of items in the packages and/or one or more related tasks within supply chain network 100. In addition, or as an alternative, these one or more users within supply chain network 100 may include, for example, one or more computers 140 programmed to autonomously handle, among other things, one or more supply chain processes such as demand planning, supply and distribution planning, inventory management, controlling manufacturing equipment, adjusting various levels of manufacturing and inventory levels at various stocking points and distribution centers, and/or one or more related allocation planning and/or order fulfilment tasks within supply chain network 100.

Supply chain entities 150 represent one or more supply chain networks 100, including one or more enterprises, such as, for example networks of one or more suppliers 152, manufacturers 154, distribution centers 156, retailers 158 (including brick and mortar and online stores), customers, and/or the like. Suppliers 152 may be any suitable entity that offers to sell or otherwise provides one or more items (i.e., materials, components, or products) to one or more manufacturers 154. Suppliers 152 may comprise automated distribution systems 153 that automatically transport items to one or more manufacturers 154 based, at least in part, on a prepack configuration determined by prepack planner 110 and/or one or more other factors described herein. In addition, or as an alternative, each of the one or more items may be represented in supply chain network 100 by an identifier, including, for example, Stock-Keeping Unit (SKU), Universal Product Code (UPC), serial number, barcode, tag, RFID, or any other device that encodes identifying information. As discussed above, one or more electronic devices 130 may generate a mapping of one or more items in supply chain network 100 by scanning an identifier associated with an item or associating the image of an item with an identifier stored in a database.

Manufacturers 154 may be any suitable entity that manufactures at least one item. Manufacturers 154 may use one or more items during the manufacturing process to produce any manufactured, fabricated, assembled, or otherwise processed item, material, component, good or product. In one embodiment, an item may be, for example, an item ready to be supplied to, for example, one or more supply chain entities 150 in supply chain network 100, such as retailers 152, an item that needs further processing, or any other item in supply chain entities 150. Manufacturers 154 may, for example, produce and sell an item to suppliers 152, other manufacturers 154, distribution centers 156, retailers 158, a customer, or any other suitable person or entity. Manufacturers 154 may comprise automated robotic production machinery 155 that produce products based, at least in part, on a prepack configuration determined by prepack planner 110 and/or one or more other factors described herein.

Distribution centers 156 may be any suitable entity that offers to store or otherwise distribute at least one item to one or more retailers 158 and/or customers. Distribution centers 156 may, for example, receive an item from a first one or more supply chain entities 150 in supply chain network 100 and store and transport the item for a second one or more supply chain entities 150. Distribution centers 156 may comprise automated warehousing systems 157 that automatically remove items from and place items into inventory based, at least in part, on a prepack configuration determined by prepack planner 110 and/or one or more other factors described herein.

Retailers 158 may be any suitable entity that obtains one or more items to sell to one or more customers. Retailers 158 may comprise any online or brick and mortar store, including stores with shelving systems 159. Shelving systems 159 may comprise, for example, various racks, fixtures, brackets, notches, grooves, slots, or other attachment devices for fixing shelves in various configurations. These configurations may comprise shelving systems 159 with adjustable lengths, heights, and other arrangements, which may be adjusted by an employee of retailers based on computer-generated instructions or automatically by machinery to place items in a desired location in retailers.

Although one or more supply chain entities 150 are shown and described as separate and distinct entities, the same entity may simultaneously act as any one of supply chain entities 150. For example, one or more supply chain entities 150 acting as a manufacturer 154 can produce an item, and the same entity can act as supplier 152 to supply an item to itself or another of one or more supply chain entity 150. Although one example of supply chain network 100 is shown and described, embodiments contemplate any configuration of supply chain network 100, without departing from the scope described herein.

In one embodiment, prepack planner 110 may be coupled with network 160 using communications link 180, which may be any wireline, wireless, or other link suitable to support data communications between prepack planner 110 and network 160 during operation of supply chain network 100. One or more electronic devices 130 are coupled with network 160 using communications link 184, which may be any wireline, wireless, or other link suitable to support data communications between one or more electronic devices 130 and network 160 during operation of supply chain network 100. Transportation network 120 may be coupled with network 160 using communications link 182, which may be any wireline, wireless, or other link suitable to support data communications between transportation network 120 and network 160 during operation of supply chain network 100. One or more supply chain entities 150 may be coupled with network 160 using communications link 188, which may be any wireline, wireless, or other link suitable to support data communications between one or more supply chain entities 150 and network 160 during operation of supply chain network 100. Computer 140 may be coupled with network 160 using communications link 186, which may be any wireline, wireless, or other link suitable to support data communications between computer 140 and network 160 during operation of supply chain network 100.

Although communication links 180-186 are shown as generally coupling prepack planner 110, one or more electronic devices 130, transportation network 120, one or more supply chain entities 150, and computer 140 to network 160, each of prepack planner 110, one or more electronic devices 130, transportation network 120, one or more supply chain entities 150, and computer 140 may communicate directly with each other, according to particular needs.

In another embodiment, network 160 includes the Internet and any appropriate local area networks (LANs), metropolitan area networks (MANs), or wide area networks (WANs) coupling prepack planner 110, one or more electronic devices 130, transportation network 120, one or more supply chain entities 150, and computer 140. For example, data may be maintained by locally or externally of prepack planner 110, one or more electronic devices 130, transportation network 120, one or more supply chain entities 150, and computer 140 and made available to one or more associated users of prepack planner 110, one or more electronic devices 130, transportation network 120, one or more supply chain entities 150, and computer 140 using network 160 or in any other appropriate manner. For example, data may be maintained in a cloud database at one or more locations external to prepack planner 110, one or more electronic devices 130, transportation network 120, one or more supply chain entities 150, and computer 140 and made available to one or more associated users of prepack planner 110, one or more electronic devices 130, transportation network 120, one or more supply chain entities 150, and computer 140 using the cloud or in any other appropriate manner. Those skilled in the art will recognize that the complete structure and operation of network 160 and other components within supply chain network 100 are not depicted or described. Embodiments may be employed in conjunction with known communications networks and other components.

In accordance with the principles of embodiments described herein, prepack planner 110 may generate a prepack solution that provides configurations of each package of items and how many of each package will be sent to each retailer 158. According to embodiments and in a simplified example, two clothing retailers 158 each have an unfulfilled demand for shirts in various sizes and colors from a single distribution center 156. According to embodiments and in this simplified example, prepack planner 110 determines a prepack solution for at least two decisions, the configuration of each pack and the quantity of packs needed to satisfy the demand at the two clothing retailers 158. The prepack solution may comprise, for example, the size of the pack, the number of items in the pack, and the attributes of each item in the pack. In addition, any prepack solution determined by prepack planner 110 must respect prepack constraints, such as, for example, a maximum and minimum quantity of packs, a maximum and minimum number of items in each pack, an overstock of each item, and any disallowed pack configurations.

Returning to the simplified example, the two clothing retailers 159 have an unfulfilled demand for shirts in various colors, sizes, and quantities based on item attributes. As discussed in more detail below, prepack planner 110 uses demand data 210 (see FIG. 2) to determine the prepack solution that will fulfill demand and satisfy factors and constraints data 218 (see FIG. 2). Although this simplified example illustrates item attributes as comprising colors, sizes, and quantities organized by retailer, embodiments contemplate any item attributes, according to particular needs. According to this simplified example, the prepack solution may comprise, for example, three configuration packs that each have three sizes of shirts, with different colors of shirts sent to each clothing retailer 158, and where one package of a first configuration is sent to a first clothing retailer 158, one package of a second configuration is sent to a second clothing retailer 158, and one package of a third configuration is sent to both of the clothing retailers 158.

Furthermore, prepack planner 110 and/or transportation network 120 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 150, and the configuration and quantity of packaging and shipping of items based, at least in part, on one or more generated prepack solutions, determined configuration of items, and/or current inventory or production levels. For example, the methods described herein may include computers receiving item data from automated machinery having at least one sensor 136 and the item data corresponding to an item detected by the automated machinery. The received item data may include an image of the item, an identifier, as described above, and/or other item data associated with the item (dimensions, texture, estimated weight, and any other like data). The method may further include computers looking up the received item data in a database system associated with prepack planner 110 and/or transportation network 120 to identify the item corresponding to the item data received from the automated machinery.

Computers 140 may also receive, from the automated machinery, a current location of the identified item. Based on the identification of the item, computers 140 may also identify (or alternatively generate) a first mapping in the database system, where the first mapping is associated with the current location of the item. Computers 140 may also identify a second mapping in the database system, where the second mapping is associated with a past location of the identified item. Computers 140 may also compare the first mapping and the second mapping to determine if the current location of the identified item in the first mapping is different than the past location of the identified item in the second mapping. Computers 140 may then send instructions to the automated machinery based, as least in part, on one or more differences between the first mapping and the second mapping such as, for example, to locate item to add to or remove from an inventory of or shipment for one or more supply chain entities 150. In addition, or as an alternative, prepack planner 110 monitors factors and constraints of one or more items and/or one or more supply chain entities 150 and adjusts the orders and/or inventory of supply chain entities 150 based on the supply chain constraints.

According to these embodiments, and as discussed in more detail below, prepack planner 110 may determine a difference between current inventory levels and the inventory reorder points for one or more items in an inventory at one or more locations in one or more supply chain entities 150. Based on the difference, prepack planner 110 may instruct the automated machinery to add items to a package in an amount equal to the inventory target quantities minus the difference between current inventory levels and the inventory reorder points. For example, the prepack planner may determine a prepack solution based on forecasted demand, current inventory levels, forecasted production levels, item attributes, pack constraints, store constraints, and the like.

Figure 2:
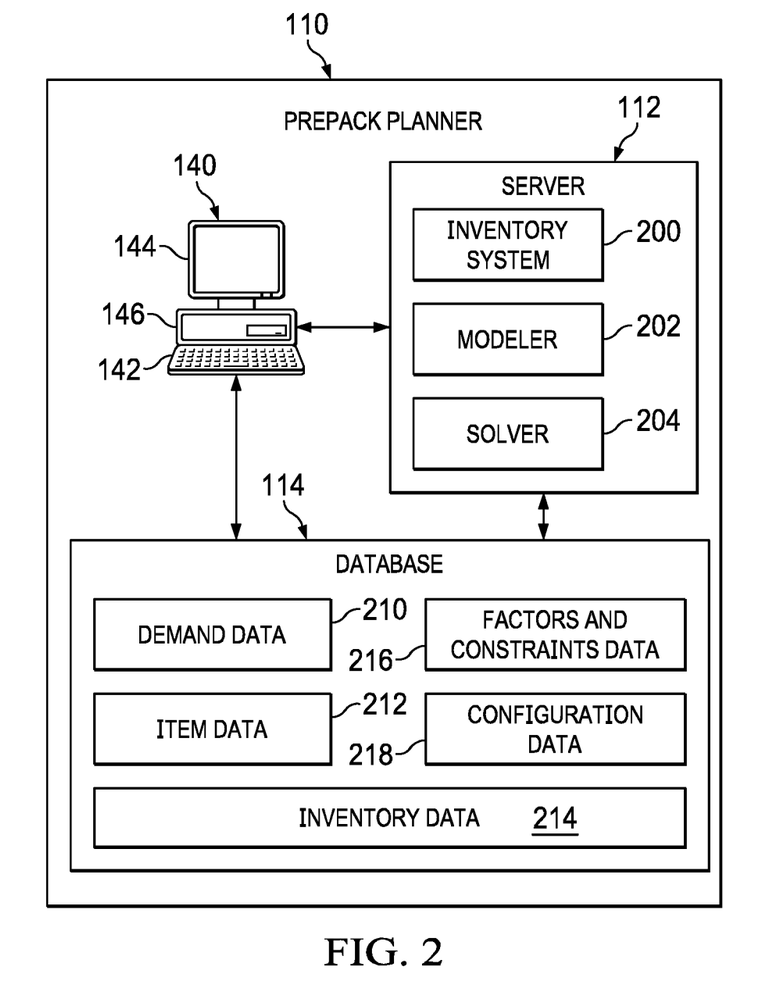
FIG. 2 illustrates the prepack planner of FIG. 1 in greater detail, in accordance with an embodiment.

FIG. 2 illustrates prepack planner 110 of FIG. 1 in greater detail in accordance with an embodiment. As discussed above, prepack planner 110 may comprise one or more computers 140 at one or more locations including associated input devices 142, output devices 144, non-transitory computer-readable storage media, processors 146, memory, or other components for receiving, processing, storing, and communicating information according to the operation of supply chain network 100. Additionally, prepack planner 110 comprises server 112 and database 114. Although prepack planner 110 is shown as comprising a single computer 140, a single server 112 and a single database 114; embodiments contemplate any suitable number of computers, servers, or databases internal to or externally coupled with prepack planner 110. According to some embodiments, prepack planner 110 may be located internal to one or more supply chain entities 150. In other embodiments, prepack planner 110 may be located external to one or more supply chain entities 150 and may be located in for example, a corporate entity of one or more supply chain entities 150, such as, a corporate retailer of the one or more retailers 158, according to particular needs.

Server 112 of prepack planner 110 may comprise inventory system 200, modeler 202, and solver 204. Although server 112 is shown and described as comprising a single inventory system 200, a single modeler 202, and a single solver 204, embodiments contemplate any suitable number or combination of these located at one or more locations, local to, or remote from prepack planner 110, such as on multiple servers or computers at any location in supply chain network 100. Server 112 stores and retrieves demand data, item data, inventory data, factors and constraints data and configuration data from database 114 or one or more locations in supply chain network 100.

Inventory system 200 is configured to receive, store, and transmit inventory data 214, including item information, item attribute data, inventory levels, and other like data about one or more items at one or more locations in supply chain network 100. In addition, inventory system 200 is configured to store and retrieve inventory data 214 in one or more databases associated with prepack planner 110 or one or more supply chain entities 150. Modeler 202 is configured to define models based, at least in part, on a mixed integer optimization problem (MIP) model and various supply chain data, including, demand data 210, inventory data 214, and pack and store constraints from factors and constraints data 216, as discussed in more detail below. Solver 204 is configured to receive a mixed integer optimization problem (MIP) and one or more constraints from modeler 202. In addition, or as an alternative, solver 204 generates a prepack configuration, as discussed in more detail below.

Database 114 of prepack planner 110 may comprise one or more databases or other data storage arrangement at one or more locations, local to, or remote from, server 112. Database 114 comprises, for example, demand data 210, item data 212, inventory data 214, factors and constraints data 216, and configuration data 218. Although, database 114 is shown and described as comprising demand data 210, item data 212, inventory data 214, factors and constraints data 216, and configuration data 218; embodiments contemplate any suitable number or combination of these, located at one or more locations, local to, or remote from, prepack planner 110 according to particular needs.

Demand data 210 of database 114 may comprise, for example, any data relating to past sales, past demand, and purchase data of one or more supply chain entities 150. Demand data 210 may be stored at time intervals such as, for example, by the minute, hour, daily, weekly, monthly, quarterly, yearly, or any suitable time interval, including substantially in real time. According to embodiments, demand data 210 may include historical demand or projected demand forecasts for one or more retail locations or regions of one or more supply chain entities 150. For example, a New York store may need 120 large black shirts and 65 medium striped black shirts while a Los Angeles store may need 34 medium yellow sweaters and 25 medium striped black shirts. Although a particular example of demand data 210 is described, embodiments contemplate any number or any type of demand data, according to particular needs.

Item data 212 of database 114 may comprise one or more data structures comprising items identified by, for example, an item identification (such as a Stock Keeping Unit (SKU), Universal Product Code (UPC) or the like) and one or more attributes and attribute values associated with the item identification, which may be stored as attribute data. Item data 212 may comprise any attributes or attribute values of one or more items organized according to any suitable database structure, and sorted by, for example, item attribute, item attribute value, item identification, or any suitable categorization or dimension. Attributes of one or more items may be, for example, any categorical characteristic or quality of an item, and an attribute value may be a specific value or identity for the one or more items according to the categorical characteristic or quality.

As an example, only and not by way of limitation, an item for a clothing retailer, may comprise the item attributes of gender, season, article of clothing, color, sleeve-length, pattern, size or the like. Item attribute values for these item attributes may comprise, for example, male or female, for gender; spring, summer, fall, winter, for season; top, blouse, shirt, bottom, pants, shorts, skirt, or the like, for article of clothing; red, blue, green, or the like, for color; long, short, medium, or the like, for sleeve-length; stripe, checked, plain, or the like for pattern, and x-small, small, medium, large, x-large and the like for the size. Although a particular item for a clothing retailer comprises particular attributes and attribute values, embodiments contemplate any type of retailer or any item, attribute or attribute value, accordingly to particular needs.

Inventory data 214 of database 114 may comprise any data relating to current or projected inventory quantities. For example, inventory data 214 may comprise the current level of inventory for each item at one or more stocking points across one or more supply chain entities 150. In addition, inventory data 214 may comprise order rules that describe one or more rules or limits on setting an inventory policy, including, but not limited to, a minimum order quantity and a maximum order quantity. According to embodiments, prepack planner 110 accesses and stores inventory data 214 in database 114, which may be used by prepack planner 110 to set inventory levels at one or more stocking points, initiate manufacturing of one or more items, generate a prepack configuration based on the inventory levels, or the like. In addition, or as an alternative, inventory data 214 may be updated by receiving current item quantities, mappings, or locations from one or more electronic devices 130, transportation system 120 and/or one or more supply chain entities 150.

Factors and constraints data 216 of database 114 may comprise, for example, pack constraints, store constraints and prepack constraints of one or more supply chain entities 150. Pack constraints may be associated with one or more supply chain entities 150 and may be, for example, a maximum number of different packs, the various sizes of packaging, the shipment times for the various packaging, and the like. Store constraints may be associated with one or more retailers 158 and may be, for example, a limit on total inventory at one or more stocking locations, such as a maximum of one item over demand, or other constraints such as a location may not receive an item when there is no demand at the location for the item. In addition, or as an alternative, store constraints may comprise store data describing the stores of one or more retailers 158. Store data may comprise, for example, a store identification, store description, store location details, store type, store area (expressed in, for example, square feet, square meters, or other suitable measurement), latitude, longitude, and other like store data. Although particular factors and constraints are described, embodiments contemplate any number of factors and constraints, according to particular needs. In addition, ore as an alternative, although data is described at a particular level of granularity, factors and variables may be determined and implemented at any level of granularity, such as by time (daily, hourly, weekly, or the like) or geographic region (retail store, state, region, or the like).

Configuration data 218 of database 114 may comprise one or more tables having one or more cells including cells for prepack identification numbers, item attributes, item attribute values, number of items, configuration data and total number of parent and child prepack configurations.

Figure 3:
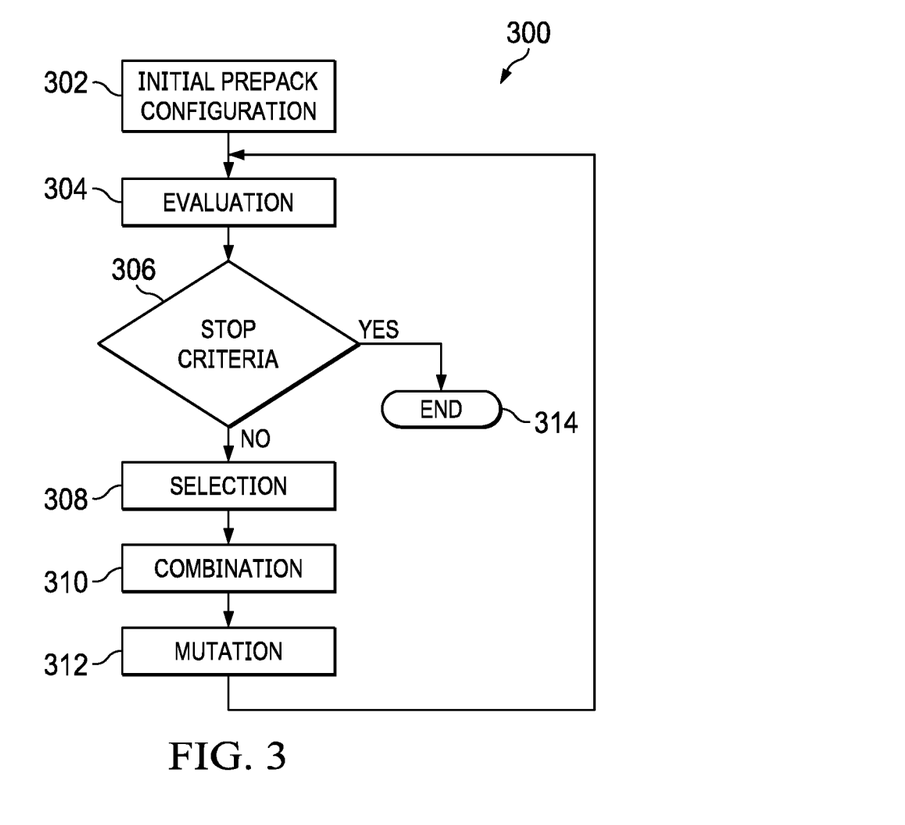
FIG. 3 illustrates an exemplary method of prepack configuration planning, according to an embodiment.

FIG. 3 illustrates an exemplary method 300 of prepack configuration planning according to an embodiment. Although prepack configuration planning is depicted as a linear process, one or more actions may be performed in any order, combination, or repetitions to perform prepack configuration planning. For example, method 300 begins with an initial prepack configuration 302, then evaluates the pack configurations by solving a mixed integer problem (MIP) 304, and if stop criteria 306 is present, prepack planner 110 generates a prepack solution. If the stop criteria 306 is not present, prepack planner 110, then uses the MIP solution to select 308, combine 310 and mutate 312 the initial prepack configurations to generate new prepack configurations, which are then added to the MIP 304. The process comprises iterative processes that are performed multiple times in various orders for a predetermined number of iterations or until stop criteria 306 is reached.

At activity 302 prepack planner 110 determines an initial prepack configuration, as a genetic algorithm. For example, prepack planner 110 may receive demand data 210 and factors and constraints data 216 from one or more retailers 158 and determine the initial prepack configuration for one or more distribution centers 156, based on the received data. In addition, or as an alternative, prepack planner 110 may determine the initial prepack configuration using a previous prepack configuration stored in configuration data 218 or randomly generate a prepack configuration.

To further explain the operation of prepack planner 110, an example is now given. In the following example, TABLE 1 provides an initial prepack configuration for an exemplary clothing retailer 158 having items represented as shirts. Although an exemplary retailer 158 is shown and described as a clothing retailer and the items are shown and described as shirts, embodiments contemplate any type of retailer and/or any type of item, according to particular needs.

TABLE 1

| Pack ID | X-Small | Small | Medium | Large | X-Large | Total |
|---|---|---|---|---|---|---|
| 1 | 2 | 3 | 1 | 0 | 1 | 7 |
| 2 | 1 | 3 | 2 | 1 | 1 | 8 |
| Total | 3 | 6 | 3 | 1 | 2 | 15 |

As shown in TABLE 1, the first package (Pack ID 1) of the initial prepack configuration includes 7 total shirts: 2 x-small shirts, 3 small shirts, 1 medium shirt, 0 large shirts and 1 x-large shirt. The second package (Pack ID 2) of the initial prepack configuration includes 8 total shirts: 1 x-small shirts, 3 small shirts, 2 medium shirts, 1 large shirt, and 1 x-large shirt. At activity 304 prepack planner 110 evaluates the initial prepack configuration by solving a Mixed Integer Problem (MIP) model. According to embodiments, the MIP model may be solved by a branch and bound algorithm that uses the simplex method.

According to embodiments, modeler 202 of prepack planner 110 generates a MIP model comprising a prepack problem with various objectives and constraints. In addition, prepack planner 110 generates a mixed integer linear program that may solve for the prepack problem, by determining how many packages to ship to each retailer 158 and the amount and configuration of items in these packages. After the one or more inputs described above are received by prepack planner 110, prepack planner 110 utilizes the MIP model to determine a prepack solution, according to the following objective (1) and constraints (2)-(3):

$$\min \sum_{i \in I} \sum_{s \in S} 10 o_{is} - \sum_{i \in I} \sum_{s \in S} u_{is} \quad (1)$$

$$\sum_{p \in P} y_{ip} x_{ps} + u_{is} - o_{is} = d_{is} \; \forall \; i \in I, s \in S$$

$$o_{is} \le l_{is} \; \forall \; i \in I, s \in S \quad (2)$$

$$x_{ps}, o_{is}, u_{is} \ge 0 \quad (3)$$

$$x_{ps} \text{ integers}$$

where, decision variables include: $x_{ps}$, the quantity of the pack p which is defined and sent to the store s of retailer 158; $u_{is}$, the under-stock of item i at store s of retailer 158; and the slack variable, $o_{is}$ the over-stock of item i at store s of retailer 158; and parameters include: $y_{ip}$, the quantity of item i in pack p; $d_{is}$, the demand of item i by store s of retailer 158; and $l_{is}$, the maximum overstock of item i at store s of retailer 158; for all: $i \in I$; $p \in P$; and $s \in S$. Although particular variables and parameters have been shown and described, embodiments contemplate any number of parameters, according to particular needs. In addition, or as an alternative, although a store s is described as one or more retailers 158; embodiments contemplate a store s of one or more manufactures 154, one or more distribution centers 156 or any other entity in one or more supply chain entities 150 where packages are used to ship items to entities to fill inventory at the receiving entity.

According to embodiments, the objective (1) of the MIP model minimizes a penalty associated with an over-cover and an under-cover of the demand data 210 for each store of retailer 158 and for each item. According to other embodiments, the constraint (2) provides for demand by the store of retailer 158 and by item, while the constraint (3) provides maximum over-cover by the store of retailer 158 and by item. For example, constraints may include the forecasted demand by the store of retailer 158 by item and the maximum over-cover by the store of retailer 158 and by item. In addition, or as an alternative, all variables for the objectives and the constraints in the MIP model are positive and are non-negative.

According to embodiments, overstock is penalized much more heavily than understock by appending a relatively large coefficient to the over slack variable. In this example, $10 o_{is}$ represents a coefficient of ten for over slack because overstock is more disruptive to the store inventory of retailer 158 than understock. In this example, $10 o_{is}$ represents that overstock is ten times more heavily penalized than the understock, however, embodiments contemplate any suitable overstock coefficient or understock coefficient, according to particular needs.

According to an embodiment, a first constraint requires that amount of items sent to a store of retailer 158 (amount of items in a pack multiplied by the number of packs) must equal demand ($d_{is}$) within a range determined by the slack variables. In this example, the equation further limits the overstock or slack value ($o_{is}$) is by the value of the maximum overstock of an item at a store ($l_{is}$) of retailer 158. Although particular objectives, constraints, quantities, and values have been described, embodiments contemplate any number of objectives, constraints, quantities, and values, according to particular needs.

At activity 306 prepack planner 110 determines whether a stop criterion has been met. If the stop criteria have not been met, the method proceeds to activity 308, otherwise, the method ends at activity 314 where the prepack solution is communicated to the one or more supply chain entities 150. According to embodiments, any stop criteria is stored in database 114 and may include, for example, total solve time, a number of iterations of the method, an amount of time without an improved solution and/or whether the solution improves upon the previous prepack solution. Although particular stop criteria are described, embodiments contemplate any form of stop criteria, according to particular needs. In addition, or as an alternative, once the MIP model solution meets the stop criteria, the prepack solution is communicated to one or more entities 150, including the determination of how many packages to ship to the one or more retailers 150 via transportation network 120 and the amount and configuration of items in each package.

At activity 308, and after prepack planner 110 determines that stop criteria 306 has not been met, prepack planner 110 selects a prepack configuration to be a parent prepack configuration of the genetic algorithm. Continuing with the above example, prepack planner 110 selects the first package (Pack ID 1) and the second package (Pack ID 2) of the initial prepack configuration of TABLE 1.

At activity 310, prepack planner 110 combines the parent prepack configurations and attributes the number of items by children randomly while keeping the same total number of items by shirt sizes (in this example) of their parents and keeping the same number of items by pack. In other words, the parent prepack configurations and child prepack configurations retain the same total values. Prepack planner 110 combines the parent prepack configuration (Pack ID 1) and (Pack ID 2) to obtain a child prepack configuration (Pack ID 3) and (Pack ID 4), as shown in TABLE 2.

TABLE 2

| Pack ID | X-Small | Small | Medium | Large | X-Large | Total |
| --- | --- | --- | --- | --- | --- | --- |
| 3 | 0 | 4 | 3 | 0 | 0 | 7 |
| 4 | 3 | 2 | 0 | 1 | 2 | 8 |
| Total | 3 | 6 | 3 | 1 | 2 | 15 |

TABLE 2 illustrates an exemplary combination 310 of the genetic heuristic. As shown in TABLE 2, the first package (Pack ID 1) and the second package (Pack ID 2) of the initial prepack configuration of TABLE 1 have been combined to generate two new child prepack configurations. The third package (Pack ID 3) of the child prepack configuration includes 7 total shirts, which is the same number of total shirts as the first parent package (Pack ID 1), however, the output of the genetic heuristic provides for: 0 x-small shirts, 4 small shirts, 3 medium shirts, 0 large shirts, and 0 x-large shirts. Also, the fourth package (Pack ID 4) of the child prepack configuration includes 8 total shirts, which is the same number of total shirts as the second parent package (Pack ID 2), however, the output of the genetic heuristic provides for: 3 x-small shirts, 2 small shirts, 0 medium shirts, 1 large shirt, and 2 x-large shirts. Accordingly, the child prepack configurations (Pack ID 3) and (Pack ID 4) inherit the attributes of the parent prepack configurations (Pack ID 1) and (Pack ID 2) selected by the MIP model and combined by the genetic heuristic. Although a particular number of parent and child prepack configurations including a particular number of items and attributes has been shown and described, embodiments contemplate any number of prepack configurations, number of items and attributes, according to particular needs.

At activity 312 prepack planner 110 mutates the child prepack configurations in a two-step mutation process. According to embodiments, the genetic heuristic may use the child prepack configuration for two mutations by selecting and changing attribute values, in this example, two sizes of shirts and exchanging a number of items for both attribute values. Although exemplary mutations have been shown and described, embodiments contemplate any type of mutation including any number of changes to attributes or attribute values, according to particular needs. In addition, or as an alternative, embodiments provide for a first mutation that is applied on a generated prepack and a second mutation that is applied on the generated prepack. In this manner, a new generated prepack may be transformed by the first mutation only, by the second mutation only, or by both the first and second mutation.

The first mutation process uses the above third package (Pack ID 3) of the child prepack configuration, which includes 7 total shirts: 0 x-small shirts, 4 small shirts, 3 medium shirts, 0 large shirts, and 0 x-large shirts. Prepack planner 110 performs a first mutation of the child prepack configuration (Pack ID 3) to obtain a new child prepack configuration (Pack ID 7), as shown in TABLE 3.

TABLE 3

| Pack ID | X-Small | Small | Medium | Large | X-Large | Total |
| --- | --- | --- | --- | --- | --- | --- |
| 7 | 0 | 4 | 0 | 3 | 0 | 7 |

TABLE 3 illustrates an exemplary first mutation 312 of the genetic heuristic. As shown in TABLE 3, the third package (Pack ID 3) of the child prepack configuration of TABLE 2 has been mutated to generate a new child prepack configuration. The seventh package (Pack ID 7) of the new child prepack configuration includes 7 total shirts, which is the same number of total shirts as the third child package (Pack ID 3), however, the output provides for: 0 x-small shirts, 4 small shirts, 0 medium shirts, 3 large shirts, and 0 x-large shirts. Accordingly, the new child prepack configuration (Pack ID 7) inherits the attributes of the child prepack configuration (Pack ID 3) generated and mutated by the genetic heuristic, except that the number of items for two attribute values has been exchanged. According to this example, the number of items for two sizes, medium and large, have been exchanged to create a new child that has zero medium and three larges instead of three medium and zero large shirts.

The second mutation process uses the above seventh package (Pack ID 7) of the child prepack configuration, which includes 7 total shirts: 0 x-small shirts, 4 small shirts, 0 medium shirts, 3 large shirts, and 0 x-large shirts. Prepack planner 110 performs a second mutation of the new child prepack configuration (Pack ID 7) to obtain a second new child prepack configuration (Pack ID 7), as shown in TABLE 3.

TABLE 4

| Pack ID | X-Small | Small | Medium | Large | X-Large | Total |
| --- | --- | --- | --- | --- | --- | --- |
| 7 | 0 | 4 | 0 | 2 | 1 | 7 |

TABLE 4 illustrates an exemplary second mutation 312 of the genetic heuristic. As shown in TABLE 4, the seventh package (Pack ID 7) of the new child prepack configuration of TABLE 3 has been mutated to generate a second new child prepack configuration. The new seventh package (Pack ID 7) of the second new child prepack configuration includes 7 total shirts, which is the same number of total shirts as the seventh child package (Pack ID 7) of FIG. 3, however, the output of the genetic heuristic provides for: 0 x-small shirts, 4 small shirts, 0 medium shirts, 2 large shirts, and 1 x-large shirt. Accordingly, the second new child prepack configuration (Pack ID 7) inherits the attributes of the second child prepack configuration (Pack ID 7) generated and mutated by the genetic heuristic, except that an attribute value with one or greater is selected and prepack planner 110 substracts one from the selected attribute value and adds that one to one of the other attributes. According to this example, the number of items for two sizes, large and x-large, have been adjusted to create a second new child that has 2 large and 1 x-large instead of 3 large and 0 large shirts. Although a particular number of new child prepack configurations including a particular number of items and attributes has been shown and described, embodiments contemplate any number of new child prepack configurations, number of items and attributes, according to particular needs.

After the mutation process is complete, the method proceeds back to activity 304, where prepack planner 110 adds the child prepack configurations into the MIP model, solves it and evaluates the solution for one or more stop criteria 306. The method continues until one or more stop criteria are met. As discussed above, once the MIP model solution meets the stop criteria, the prepack solution is communicated to one or more entities 150, including the determination of how many packages to ship to the one or more retailers 150 via transportation network 120 and the amount and configuration of items in each package. For example, as discussed above, in the simplified example, of the two clothing retailers 158 that each have an unfulfilled demand for shirts in various sizes and colors from a single distribution center 156. After the stop criteria is reached, prepack planner 110 would communicate the prepack solution to the two clothing retailers 158 and the distribution center 156. Distribution center 156 would pack and send one package of a first configuration to a first retailer 158, one package of a second configuration to a second clothing retailer 158, and one package of a third configuration to both retailers 158.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system, comprising: a prepack planner comprising a processor and a memory, the prepack planner configured to: generate a mapping of two or more items, using an identifier associated with each of the two or more items; determine an initial prepack configuration of a package using a previous prepack configuration, the prepack configuration comprising the two or more items to be included in the package, the two or more items comprising one or more attributes and two or more attribute values; evaluate the initial prepack configuration by solving a mixed integer problem model; select the initial prepack configuration to be the parent prepack configuration; generate one or more child prepack configurations by attributing the number of the two or more attribute values of the two or more items to the one or more child prepack configurations; mutate the one or more child prepack configurations by changing the two or more attribute values of the two or more items with two of the two or more attributes, wherein the changing further comprises exchanging attribute values of at least one attribute between at least two items of the two or more items; repeat the generate and mutate steps until a stop criterion is met comprising an amount of time without improving a solution to the initial prepack configuration; and in response to the stop criterion being met, autonomously sending to automated machinery and to automated robotic production machinery, by the prepack planner, instructions to cause the automated machinery to retrieve an amount of the two or more items and to move the amount of the two or more items to be included in the package, and instructions to cause the automated robotic production machinery to produce the two of more items based on the solution to the initial prepack configuration.

2. The system of claim 1, wherein the stop criteria is selected from the group comprising:
  total solve time;
  total number of iterations;
  an amount of time without an improved solution; and
  whether the solution improves upon the previous prepack solution.

3. The system of claim 1, wherein
  the previous prepack configuration is stored in configuration data.

4. The system of claim 1, wherein the prepack planner is further configured to determine an initial prepack configuration for two or more packages.

5. The system of claim 4, wherein the prepack planner is further configured to generate two or more child prepack configurations by attributing the number of the two or more items to the two or more child prepack configurations based on the two or more packages.

6. The system of claim 1, wherein the mixed integer problem is solved by a branch and bound algorithm that uses the simplex method.

7. The system of claim 1, wherein the prepack planner is further configured to further mutate the one or more child prepack configurations by subtracting one of the two or more attribute values of the two or more items and adding that one attribute value to one of the other attributes.

8. A method, comprising: generating, by a prepack planner, a mapping of two or more items using an identifier associated with each of the two or more items; determining, by the prepack planner, an initial prepack configuration of a package using a previous prepack configuration, the prepack configuration comprising the two or more items to be included in the package, the two or more items comprising one or more attributes and two or more attribute values; evaluating, by the prepack planner, the initial prepack configuration by solving a mixed integer problem model; selecting, by the prepack planner, the initial prepack configuration to be the parent prepack configuration; generating, by the prepack planner, one or more child prepack configurations by attributing the number of the two or more attribute values of the two or more items to the one or more child prepack configurations; mutating, by the prepack planner, the one or more child prepack configurations by changing the two or more attribute values of the two or more items with two of the two or more attributes, wherein the changing further comprises exchanging attribute values of at least one attribute between at least two items of the two or more items; repeating the generating and mutating steps until a stop criterion is met comprising an amount of time without improving a solution to the initial prepack configuration; and in response to the stop criterion being met, autonomously sending to automated machinery and to automated robotic production machinery, by the prepack planner, instructions to cause the automated machinery to retrieve an amount of the two or more items and to move the amount of the two or more items to be included in the package, and instructions to cause the automated robotic production machinery to produce the two of more items based on the solution to the initial prepack configuration.

9. The method of claim 8, wherein the stop criteria is selected from the group comprising:
  total solve time;
  total number of iterations;
  an amount of time without an improved solution; and
  whether the solution improves upon the previous prepack solution.

10. The method of claim 8, wherein
  the previous prepack configuration is stored in a database coupled with the prepack planner.

11. The method of claim 8, further comprising determining an initial prepack configuration for two or more packages.

12. The method of claim 11, further comprising generating two or more child prepack configurations by attributing the number of the two or more items to the two or more child prepack configurations based on the two or more packages.

13. The method of claim 8, wherein the mixed integer problem is solved by a branch and bound algorithm that uses the simplex method.

14. The method of claim 8, further comprising mutating the one or more child prepack configurations by subtracting one of the two or more attribute values of the two or more items and adding that one attribute value to one of the other attributes.

15. A non-transitory computer-readable medium comprising software, the software when executed configured to: generate a mapping of two or more items using an identifier associated with each of the two or more items; determine an initial prepack configuration of a package using a previous prepack configuration, the prepack configuration comprising the two or more items to be included in the package, the two or more items comprising one or more attributes and two or more attribute values; evaluate the initial prepack configuration by solving a mixed integer problem model; select the initial prepack configuration to be the parent prepack configuration; generate one or more child prepack configurations by attributing the number of the two or more attribute values of the two or more items to the one or more child prepack configurations; mutate the one or more child prepack configurations by changing the two or more attribute values of the two or more items with two of the two or more attributes, wherein the changing further comprises exchanging attribute values of at least one attribute between at least two items of the two or more items; repeat the generate and mutate steps until a stop criterion is met comprising an amount of time without improving a solution to the initial prepack configuration; and in response to the stop criterion being met, autonomously send to automated machinery and to automated robotic production machinery, by the prepack planner, instructions to cause the automated machinery to retrieve an amount of the two or more items and to move the amount of the two or more items to be included in the package, and instructions to cause the automated robotic production machinery to produce the two of more items based on the solution to the initial prepack configuration.

16. The non-transitory computer-readable medium of claim 15, wherein the stop criteria is selected from the group comprising:
    total solve time;
    total number of iterations;
    an amount of time without an improved solution; and
    whether the solution improves upon the previous prepack solution.

17. The non-transitory computer-readable medium of claim 15, wherein
    the previous prepack configuration is stored in a database coupled with the prepack planner.

18. The non-transitory computer-readable medium of claim 15, further comprising determine an initial prepack configuration for two or more packages.

19. The non-transitory computer-readable medium of claim 18, wherein the software when executed is further configured to generate two or more child prepack configurations by attributing the number of the two or more items to the two or more child prepack configurations based on the two or more packages.

20. The non-transitory computer-readable medium of claim 15, wherein the software when executed is further configured to mutate the one or more child prepack configurations by subtracting one of the two or more attribute values of the two or more items and adding that one attribute value to one of the other attributes.

* * * * *